Patented Apr. 10, 1945

2,373,261

UNITED STATES PATENT OFFICE 2,373,261

SULPHUR DYE COMPOSITION AND METHOD OF MANUFACTURE

Ewen D. Robinson and John C. Boesch, Jr., Mount Holly, N. C., assignors to Southern Dyestuff Corporation, a corporation of North Carolina No Drawing. Application December 22, 1941, Serial No. 423,991

10 Claims. (Cl. 8—37)

Our invention relates to the art of printing natural or artificial fibers and more particularly to a non-corrosive, sulphur dyestuff composition that does not require the usual reducing agents; such as sulphides or hydrosulphites, for printing various colors and designs on fabrics of cellulose fibers.

One of the principal characterizing features of the composition of our invention is that the dyestuff or printing material used therein may be a sulphur type of dyestuff. The use of sulphur dyes, generally speaking, has been limited heretofore in the printing art, as distinguished from dyeing, since they normally contain sulphides as reducing agents and these sulphides have a corrosive action on the metal printing plates or rolls. Common examples of such sulphides are sodium sulphide, sodium hydrosulphide and sodium disulphide. The deleterious effects of these reducing agents have definitely limited commercial use to date of the sulphur dyes for printing of fabrics.

In accordance with our present invention we have produced a sulphur dyestuff that is entirely suitable for printing purposes in view of the fact that it does not require any sulphides or similar reducing agents. We have discovered that a new sulphur printing color may be produced by combining a sulphur dyestuff with certain amines while omitting the usual sulphide reducing agents and in fact all other reducing agents, if desired.

The amines function apparently as solvents or dispersing agents for the dyestuff and convert the latter into a state of extremely fine subdivision, at least of colloidal size and in some instances perhaps of molecular size. This produces a liquid printing composition in the form of a colloidal dispersion or true solution, which we shall refer to hereinafter as a "solution." The solution may be prepared in either weak or concentrated form as desired. In a commercially advantageous form the solution is capable of being filtered.

We are aware that amines generally have been proposed heretofore for replacing the alkali in dyeing and printing compositions intended for use on wool, which would be damaged by the alkali. However, these compositions still employ the reducing agents such as sulphides and are objectionable for the reasons given above. Furthermore, we have found in actual practice that these compositions containing no alkali will not dye satisfactorily. None of these prior attempts show an appreciation of the feature inherent in our invention; that is, certain amines may be used in alkali solution in lieu of the usual reducing agents.

The printing composition of our invention may be employed in the usual way for printing of fabrics. This normally involves the mixing of the dyestuff solution with a suitable printing paste (which may contain starch, gum, or synthetic printing materials) that gives the dyestuff proper viscosity for use on the printing machines.

In preparing the printing composition of our invention practical use may be made of the moist press cake that is commonly produced in the manufacture of sulphur dyes; and it is not necessary to dry the sulphur colors to the usual dry powder form. The moist dyestuff press cake is easily dissolved or dispersed in an alkaline solution of an ethyleneamine. In the usual case a press cake of the sulphur colors, such as for example, sulphur black, blue, green or yellow, or any other desired sulphur color, is dissolved in a caustic or other suitable alkali solution of the amine. The mixture is advantageously heated to accelerate the desired solubilizing effect of the amine or amines on the sulphur colors; although, in certain cases no heat is required. Generally speaking, the temperature may vary from about room temperature up to the boiling point of the solution. An example of the latter is about 110° C.

The amines that we have found suitable for dispersing or dissolving the dyestuffs include the ethylene and polyethylene amines. Examples of such amines are: ethylenediamine; diethylenetriamine; triethylenetetramine; tetraethylenepentamine; pentaethylenehexamine. These amines may be classified as straight chain, aliphatic amines including both primary and secondary amines. Suitable examples of the amines useful in our invention may be represented by the following formula:

$(C_2H_4)_x(NH_2)_2(NH)_y$ in which $x$=a whole number from 1 to 5, $y$=a number between 0 and 4 and always one less than $x$.

In our composition any one of the above represented amines may be used alone or various combinations of two or more of the amines may be used. We have found it advantageous to use the ethylene or polyethylene amines since they have the maximum dispersing or dissolving action on the sulphur dyestuff. In actual commercial practice we have obtained excellent results with a mixture of the polyethyleneamines comprising diethylenetriamine, triethylenetetramine and tetraethylenepentamine. These amines, in a 25% solution, have a pH value of around 12, and the final composition of amines, dyestuff and alkali, has usually a somewhat higher pH value.

The alkali alone will not produce a satisfactory printing solution of the sulphur dyestuff and the commonly used sulphide reducing agents have the disadvantages previously mentioned. The amines, we have discovered, can take the place of the usual reducing agents and produce a satisfactory printing solution without objectionable characteristics.

The proportions for the several constituents of our printing composition and permissible variations are generally as follows:

| | Per cent |
|---|---|
| Amines, e. g. polyethylene amines | 8–15 |
| Alkali, e. g. caustic soda (flake) | 5–15 |
| Dyestuff | 1–50 |
| Water | Balance |

In general practice it is not desirable to use substantially greater than about 50% of the dyestuff since the solubility of greater amounts in the amines and other liquid components of the composition decreases rapidly, and non-uniformity of solution or dispersion of the dyestuff may result.

For purposes of illustration and not by way of limitation, the following examples are given for the preparation of our printing composition, utilizing sulphide free press cakes of different sulphur colors which it will be understood may be varied as desired. The resulting respective products may be thickened with the usual starch or other paste to facilitate application to the goods that are to be printed.

Example 1—Sulphur black 150 parts of a press cake containing approximately 45% dry material, obtained by precipitating the thionation product of 2:4 dinitro sodium phenolate and an alkaline polysulphide, is added to a solution of 130 parts water, 40 parts triethylenetetramine, and 80 parts 50% liquid caustic soda. Heat is applied and the temperature is brought up to about 90°-100° C. for about 30 minutes. A concentrated solution results, which may be filtered and used immediately, or stored for future use.

Example 2—Sulphur blue 300 parts of a press cake, obtained from a thionation of P - aminotolyl - p - hydroxyphenylamine and a polysulphide, is added to a solution of 412 parts water, 125 parts of a 50–50 mixture of diethylene triamine and triethylene tetramine, and 162 parts 50% liquid caustic soda. The mixture is then heated to about 95° C.–100° C. for about 30 minutes; cooled to 70° C.–80° C. and filtered.

Example 3—Sulphur green 271 parts of a press cake, obtained by the thionation of 4-p-hydroxyphenylamine-1-phenyl-naphthylamine-8-sulphonic acid and a polysulphide, is stirred into a solution of 550 parts water, 75 parts mixture of polyethylene amines (containing 50% diethylene triamine—25% triethylene tetramine and 25% tetraethylene pentamine), 100 parts 50% liquid caustic soda. The temperature is brought up to about 95° C.–100° C. and held there for about 30 minutes. This solution is now cooled to about 75° C.–80° C. and filtered.

Example 4—Sulphur yellow

A press cake is obtained by precipitating with sodium bisulphite a solution of the thionation melt from benzidene base, para toluidine, diformyl metatolyene diamine and sulphur. 600 parts of the press cake is added to a solution of 525 parts water, 150 parts tetraethylene pentamine, 200 parts 50% liquid caustic soda. Heat is applied and the temperature is brought up to about 95° C.–100° C. and maintained for about 30 minutes. The composition is allowed to cool to about 80° C. and then filtered.

It will be understood by those skilled in this art that the sulphides used for preparing the press cakes in the above examples are removed according to usual practice and do not remain in the press cakes when the latter are solubilized to form the final printing composition. The sulphides or other reducing agents normally used in the application of sulphur colors for dyeing purposes are not required in our printing composition. They may be added to our composition, if anyone should desire to do so, but they are not necessary components of the printing composition.

The printing composition of our invention, as above described, makes it now commercially possible to utilize sulphur dyes in the printing art; whereas, heretofore the sulphur dyestuffs have been limited substantially in their commercial aplications to dyeing. By means of our invention one can utilize sulphur colors in the same manner as the vats or other commonly used forms of dyestuffs for printing of fabrics.

In the foregoing the composition of our invention has been described principally as a printing material since this is the type of use in which the greatest commercial value of the invention resides at the present time. Economically, our composition does not offer at the present time as great advantages in dyeing as it does in printing since the common, sulphide reduced dyestuffs may be used for dyeing. However, if desired our composition may be adapted for dyeing purposes.

Our composition has properties that suggest its classification as a true solution and also in certain cases has properties that suggest classification as a dispersion. For sake of simplicity, the word "solution" being used in the appended claims but it is to be understood that this is an inclusive term and is intended to cover both dispersions and true solutions.

Various modifications and changes may be made in the substances, composition, and procedures described above without departing from the scope of our invention, some of the novel features of which are defined in the appended claims.

We claim:

1. A liquid sulphur dye composition adapted for printing, containing substantially no reducing agents and comprising an alkali solution of sulphur dye, and a mixture of aliphatic, straight chain, non-substituted, polyethylene amines.

2. A process of preparing a composition adapted for printing or dyeing, comprising mixing a sulphur dyestuff press cake with an alkali and a straight chain non-substituted, aliphatic amine having an ethylene group so as to effect a substantially uniform solution of the several components and heating to accelerate the solubilizing of the dyestuff.

3. A process of preparing a composition adapted for printing or dyeing, comprising mixing a sulphur dyestuff press cake with an alkali and a straight chain amine having the following formula:

in which $x=$ a whole number from 1 to 5, $y=$ a number between 0 and 4 and always one less than $x$, and heating to effect a substantially uniform solution of the several components.

4. A liquid, sulphur dyestuffs composition that is adaptable for printing and is substantially free of corrosive, sulphide and hydrosulphite reducing agents, comprising an aqueous, alkaline, solution or dispersion of sulphur dyestuff and an open-chain, aliphatic amine having the following formula:

in which $x=$ a whole number from 1 to 5 and $y=$ a number between 0 and 4 and always one less than $x$.

5. A liquor sulphur dyestuffs composition comprising a substantially non-corrosive, alkali solution or dispersion of unreduced sulphur dyestuffs substantially free of sulphide, sulphite, and hydrosulphite or other corrosive reducing agents, and an amine having the following formula:

in which $x=$ a whole number from 1 to 5 and $y=$ a number between 0 and 4 and always one less than $x$.

6. A sulphur dyestuffs solution which is free of the usual corrosive sulphides, hydrosulphites and sulphites or other corrosive reducing agents and which in place thereof contains in combination with the sulphur dyestuffs a substantial amount of an open-chain, aliphatic amine having the formula

in which $x=$ a whole number from 1 to 5 and $y=$ a number between 0 and 4 and always one less than $x$.

7. A sulphur dyestuffs solution as defined in claim 6 and in which the amine is ethylenediamine.

8. A sulphur dyestuffs solution as defined in claim 6 and in which the amine is diethylenetriamine.

9. A sulphur dyestuffs solution as defined in claim 6 and in which the amine is tetraethylenepentamine.

10. In the process of producing a non-corrosive, sulphur dyestuff adaptable for printing textiles and substantially free of reducing agents, the step of finely dispersing the sulphur dyestuff in an alkaline solution of a straight chain, aliphatic amine having an ethylene group, the dispersed dyestuff being filtrable and useful in a printing composition.

EWEN D. ROBINSON.
JOHN C. BOESCH, Jr.